Jan. 15, 1957   P. W. CRIST   2,778,012
PULSE SYNCHRONIZER
Filed Dec. 7, 1949   4 Sheets-Sheet 1

INVENTOR
PHILIP W. CRIST
BY
Paul B. Hunter
ATTORNEY

Jan. 15, 1957 P. W. CRIST 2,778,012
PULSE SYNCHRONIZER
Filed Dec. 7, 1949 4 Sheets-Sheet 2
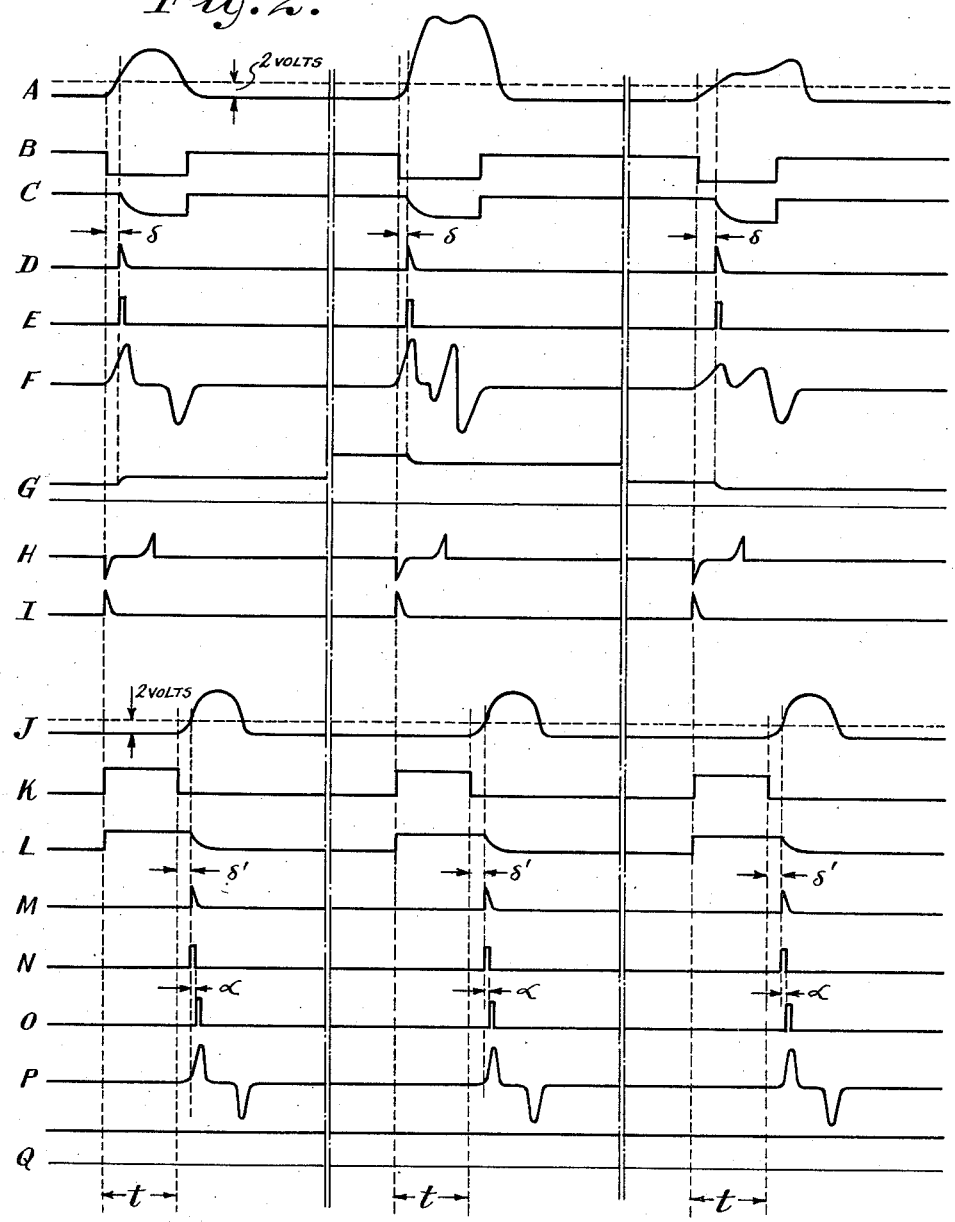
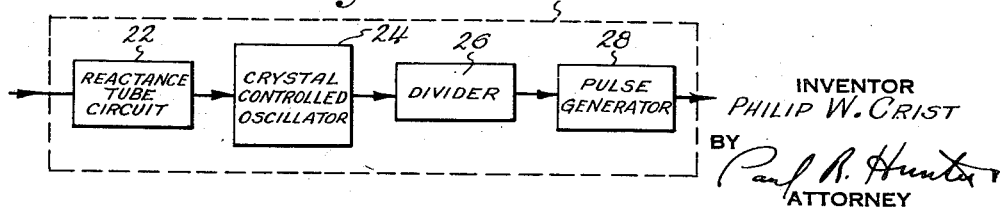
INVENTOR
PHILIP W. CRIST
BY
ATTORNEY Jan. 15, 1957 P. W. CRIST 2,778,012
PULSE SYNCHRONIZER
Filed Dec. 7, 1949 4 Sheets-Sheet 3
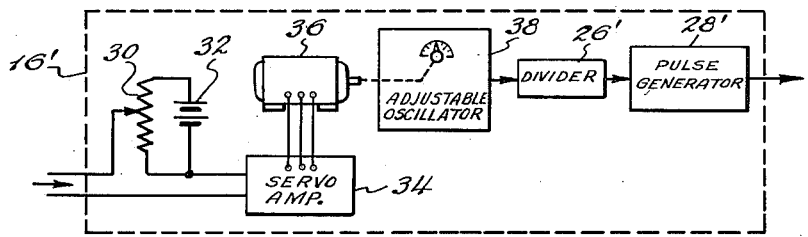
*Fig. 4.*
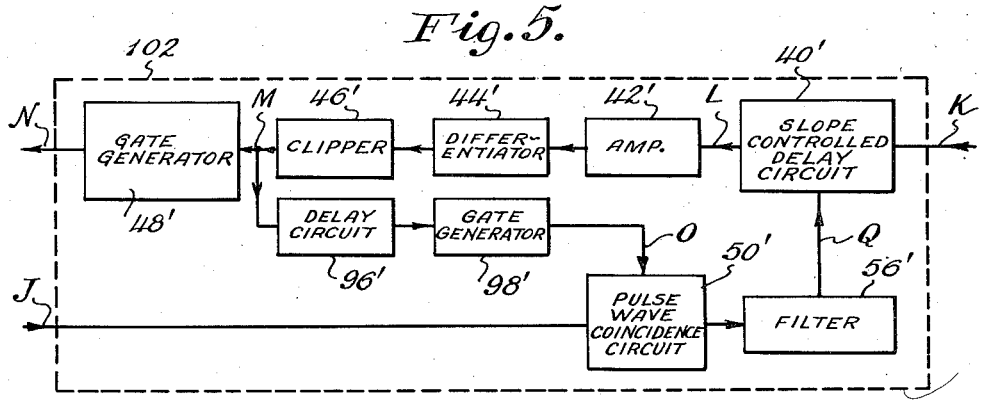
*Fig. 5.*
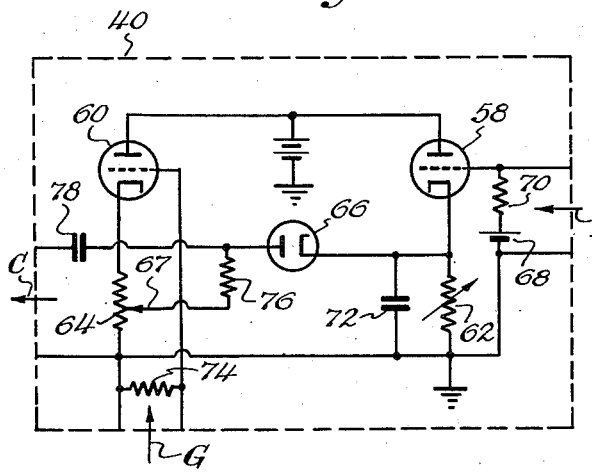
*Fig. 6.*
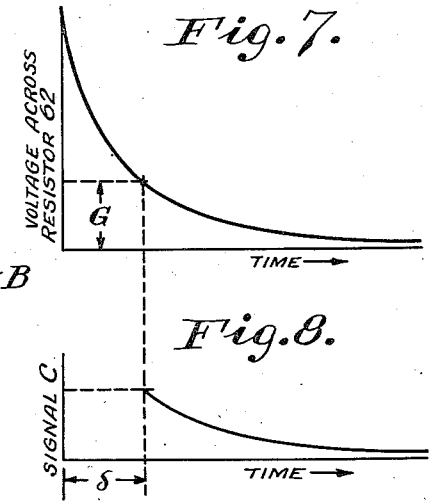
*Fig. 7.*
*Fig. 8.*
INVENTOR
PHILIP W. CRIST
BY
Paul B. Hunter
ATTORNEY Jan. 15, 1957    P. W. CRIST    2,778,012
PULSE SYNCHRONIZER
Filed Dec. 7, 1949    4 Sheets-Sheet 4
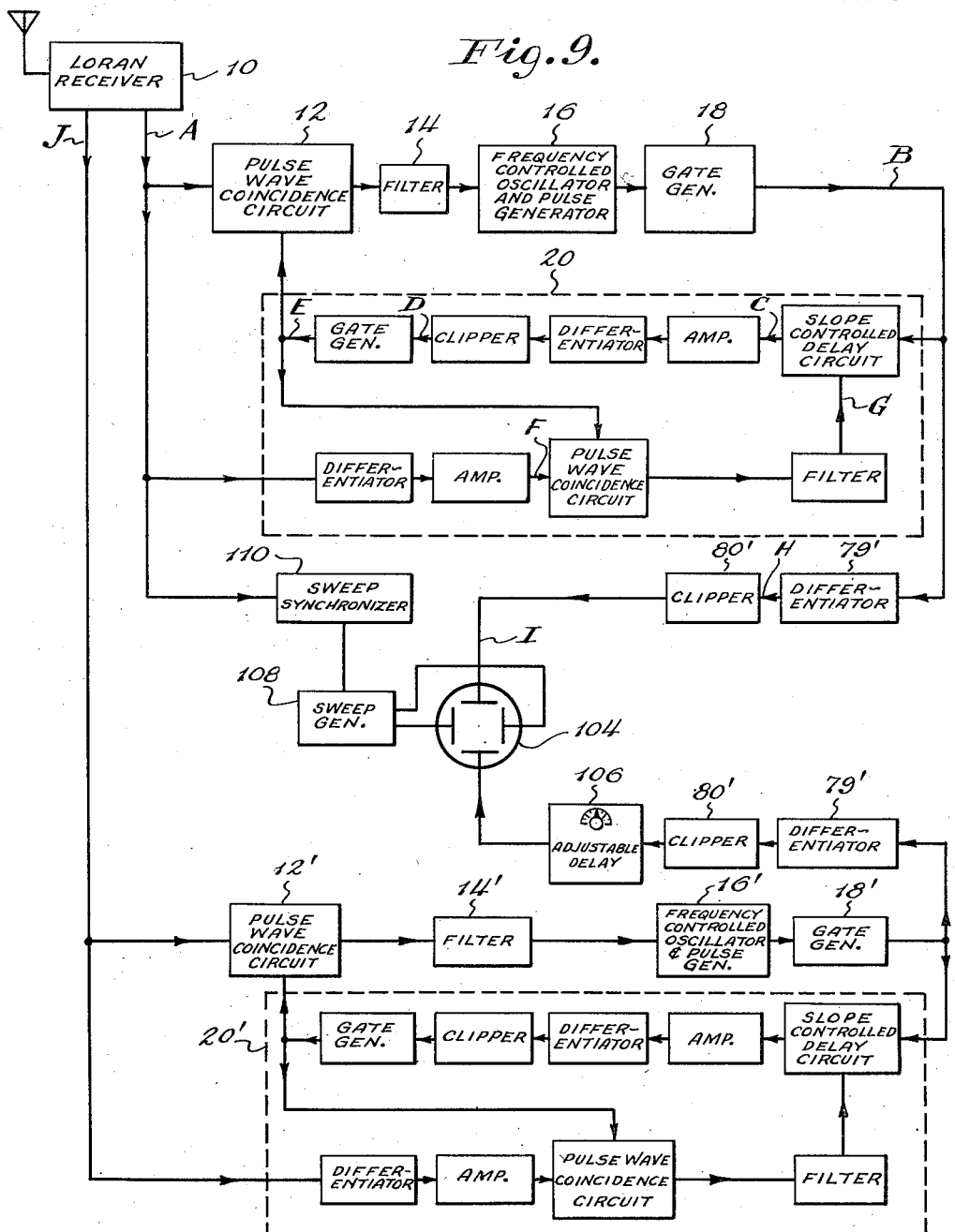

United States Patent Office 2,778,012
Patented Jan. 15, 1957

2,778,012

PULSE SYNCHRONIZER

Philip W. Crist, Hempstead, N. Y., assignor to Sperry Rand Corporation, a corporation of Delaware Application December 7, 1949, Serial No. 131,684

12 Claims. (Cl. 343—103)

This invention relates to automatic synchronizer circuits and particularly to apparatus for generating and precisely synchronizing a series of pulses in predetermined time relation with recurrent control pulses.

Automatic systems for producing and synchronizing a series of pulses with a series of recurrent control pulses are known in the prior art. Generally, such systems are actuated by the amplitude of the control pulses and hence are adversely affected by random noise signals and by changes in the amplitude or wave form of the control pulses so that the synchronized pulses do not always occur in precisely the same time relation with reference to the respective control pulses; e. g., in Loran systems pulses of carefully controlled shape are transmitted in predetermined time relation from two locations and receiving equipment on a mobile craft is employed to receive and detect the pulses and to provide a measure of the time-delay between the pulses received from the two locations, from which a hyperbolic line of position of the craft is ascertained. The accuracy with which the line of position is determined depends, of course, upon the accuracy of the time-delay measurement. This, in turn, has in the past been limited by the appreciable effects of sky-wave interference (night effect) and consequent distortion of the pulse wave forms received. Prior pulse timing circuits and devices have been quite vulnerable to this "sky-wave" distortion, and vulnerable also to the effects of noise in the output of the Loran radio receiver.

These difficulties are substantially overcome in the apparatus disclosed by Walter N. Dean in copending application S. N. 117,917 filed September 15, 1949, for a Pulse Synchronizer which employs a large time-constant servo system which is controlled by the rate of increase in the magnitude of the Loran pulses to effect synchronization.

Application S. N. 131,677 filed by Robert Frank on the same date as the present application discloses and claims the pulse synchronizer and automatic time-delay indicator disclosed herein in the second servo loop of Fig. 1.

The present invention is an improvement over the Dean invention providing greater accuracy and reliability in performance. In a preferred embodiment, a large time-constant servo system which is controlled by the rate of increase of the magnitude of the respective loran pulses is employed to effect synchronization. Precise control over the synchronization is achieved by employing a variable delay circuit for introducing a delay in the servo system which varies inversely with a control voltage. This control voltage has a magnitude which varies directly in accordance with the rate of increase in the magnitude (i. e. the slope), of the respective loran pulses at the time when the respective loran pulses attain a predetermined amplitude.

In a preferred embodiment of the invention, the control voltage is obtained by means of a pulse wave coincidence circuit which is responsive to a differentiated version of the loran pulses at a time when the pulses attain a predetermined amplitude. An alternative method of obtaining the control voltage is by means of a pulse wave coincidence circuit which is responsive to the loran pulses at a predetermined time after each pulse attains a predetermined magnitude.

Accordingly, it is an object of this invention to provide an improved loran receiving system of great accuracy and reliability which is not adversely affected by sky-wave interference or by changes in the amplitude of the pulses received or by random noise signals in the output of the loran receiver.

Another object of the invention is to provide automatic pulse synchronization apparatus which is responsive to the rate of increase in the magnitude of each of the control pulses.

Further objects and advantages of the invention will be apparent from the following description, the appended claims and the drawings, in which:

Fig. 2 shows various curves representing the wave form of and time relationships between signals which are produced in various parts of the apparatus shown in Fig. 1;

Figs. 3 and 4 show two alternative embodiments of the frequency controlled oscillator and pulse generator shown in the block diagram of Fig. 1;

Fig. 5 shows an alternative embodiment of the slope correction circuits shown in the block diagram of Fig. 1;

Fig. 6 shows a schematic diagram of the slope controlled delay circuit shown in block diagrammatic form in Fig. 1;

Figs. 7 and 8 are two curves illustrating the operation of the apparatus shown in Fig. 6; and Fig. 9 is a block diagrammatic disclosure similar to Fig. 1 showing how the slope correction circuits disclosed herein may be employed in a circuit requiring manual adjustments on the part of an operator to obtain the time-delay reading.

Figure 1:
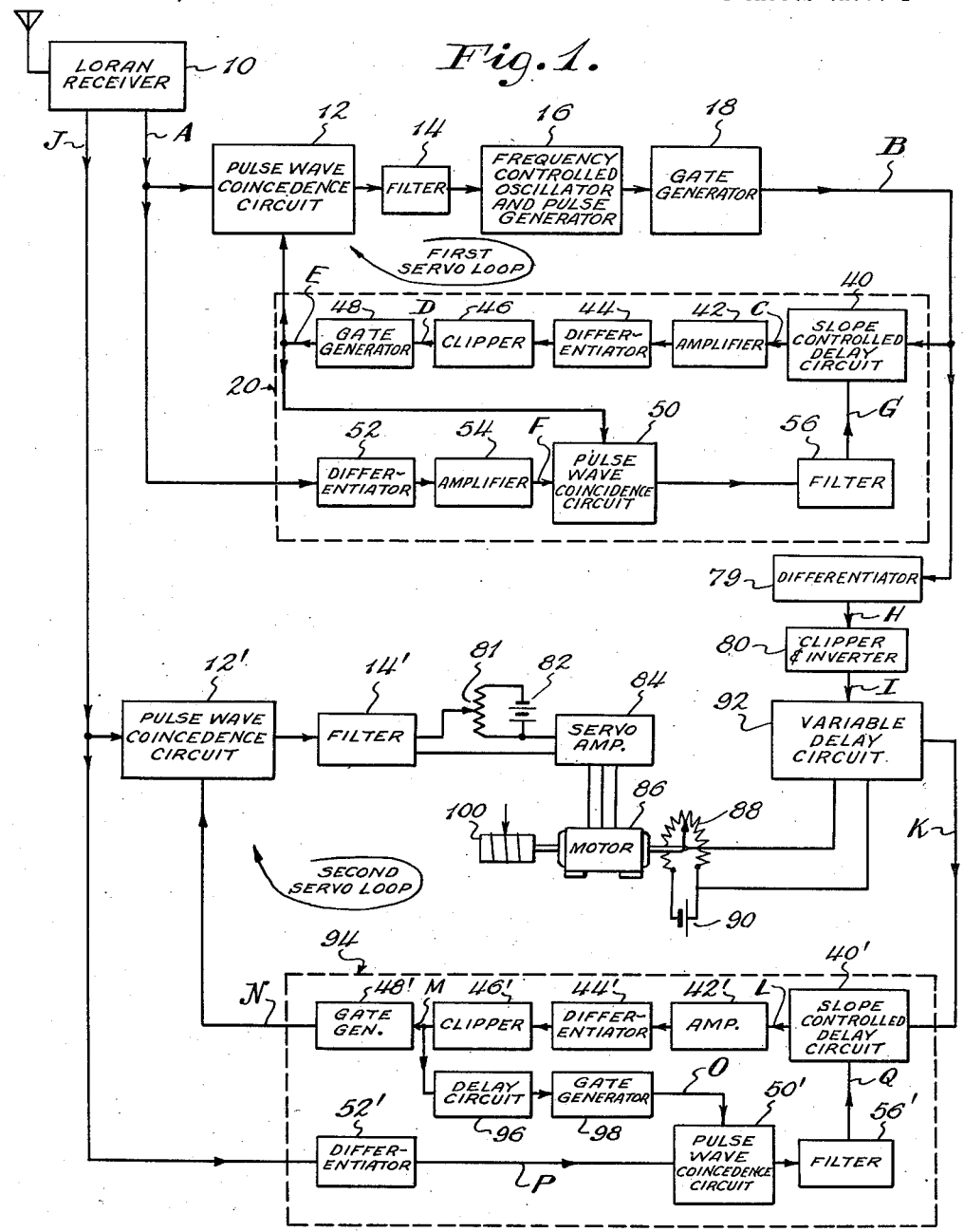
Fig. 1 is a block diagrammatic disclosure of the synchronizer apparatus showing how it may be employed in a loran receiving system.

In the discussion of the preferred embodiment of this invention which follows, frequent reference will be made to Fig. 2 which shows the wave form of and time relations between the various signals which occur in the apparatus disclosed in Fig. 1. It is to be observed that the letter which identifies each curve in Fig. 2 is also employed in Fig. 1 to identify the circuit which conveys the corresponding signal.

Referring now to Figs. 1 and 2, the loran receiver 10 serves to receive and detect the master and slave signals produced by a loran transmitting system (not shown). The detected master pulses are produced at A and the detected slave pulses are produced at J.

The wave forms shown for the master pulses A and the slave pulses J are illustrative of the wave forms actually received under three normal operating conditions in which the receiving apparatus is located approximately a fixed distance from the slave transmitter and a variable distance from the master transmitter of the loran system. The first master pulse A is not affected by sky-wave interference. The second and third master pulses A are affected by sky-wave interference which distorts the trailing edges of these pulses. The difference in the amplitudes of the three master pulses A results from differences in the distance between the loran receiver and the master transmitter of the loran system and to some extent from differences in the atmospheric conditions. The three slave pulses J are illustrative of a fixed set of receiving conditions in which the pulses are of constant amplitude and each pulse is not affected by sky-wave interference.

The master pulses A are applied to a first servo loop which comprises a pulse wave coincidence circuit 12, a filter 14, a frequency controlled oscillator and pulse generator 16, a gate generator 18, and a portion of a slope correction circuit 20. The pulse wave coincidence circuit 12 is a sampling circuit such as the four diode type shown on page 12 of the Proceedings of the Institute of Radio Engineers for January 1943 and it serves to sample the magnitude of the pulses A during each of the gates E which are applied to the control circuit thereof, thereby producing output signals having magnitudes which are substantially equal to the magnitude of the pulses A during each of the gates E. The filter 14, which may be a conventional type employing lumped constants, has a long time-constant with respect to the repetition rate of the received master pulses A. The frequency controlled oscillator and pulse generator 16 may be either of the types shown in Figs. 3 and 4. The gate generator 18 may be a conventional type and it serves to produce a negative gate B having a duration of the order of the duration of the master pulses A.

Fig. 3 shows a frequency controlled oscillator and pulse generator 16 which is suitable for use in loran systems in which the pulses have a single repetition rate. A reactance tube circuit 22, which is responsive to the output of the filter 14, is employed to vary the frequency of a crystal controlled oscillator 24 over a small range. The frequency of the output of oscillator 24 is reduced to the repetition rate of the master pulses A by a divider 26, which may be a conventional type, and the output of the divider 26 is applied to a pulse generator 28 which serves to produce a pulse of short duration in response to each cycle of the output of the divider 26.

The alternative frequency controlled oscillator and pulse generator 16' shown in Fig. 4 is suitable for use in loran systems in which more than one transmitter system is employed and some of the transmitter systems produce pulses having a repetition rate which differs from the repetition rate of the pulses produced by the other transmitter systems. A potentiometer 30 which is connected across a battery 32 serves to complete the circuit between the filter 14 and a servo amplifier 34, and the voltage introduced into the servo loop by the potentiometer 30 is of opposite polarity to the voltage produced by the filter 14. The output of the servo amplifier 34 is applied to a servomotor 36 which serves to control the frequency of an adjustable oscillator 38 over the required frequency range. The frequency of the output of the adjustable oscillator 38 is reduced to the repetition rate of the master pulses A by a divider 26' which may be the same type as the divider 26, and the output of the divider 26' is applied to a pulse generator 28' which may be the same type as the pulse generator 28 and serves to produce a pulse of short duration in response to each cycle of the output of the divider 26'.

An important feature of slope correction circuit 20 is the slope controlled delay circuit 40 which will be described in detail hereinafter. Gate B and signal G (which has a magnitude which varies in accordance with the rate of increase in the magnitude of the respective master pulses A) are applied to the slope controlled delay circuit 40 and signals C are produced thereby which are delayed a time $\delta$ after the leading edges of the respective gates B. The time-delay $\delta$ varies inversely with the magnitude of the signal G.

The signals C are amplified by amplifier 42, the amplified signals are differentiated by a conventional differentiator 44, the differentiated signals are clipped by a conventional clipper 46, and the output D of the clipper 46 is employed to actuate a conventional gate generator 48 to produce gates E which are of very short duration with respect to the duration of each of the master pulses A.

The gates E are applied to pulse wave coincidence circuit 12 and serve to actuate this circuit during each gate E so that the magnitude of the signal A is sampled during each of the gates E. The circuit constants of the first servo loop are proportioned so that the gates E are caused to occur when the respective master pulses attain a predetermined magnitude such as two volts for example. If the frequency controlled oscillator and pulse generator 16 shown in Fig. 3 is employed, this may be accomplished by adjusting the fixed bias voltage on the grid of the reactance tube. If the frequency controlled oscillator and pulse generator 16' shown in Fig. 4 is employed, this may be accomplished by adjusting the potentiometer 30.

The gates E are also applied to pulse wave coincidence circuit 50 which may be the same type as circuit 12. Also a differentiated version F of the master pulses A is applied to the pulse wave coincidence circuit 50 by means of a differentiator 52 and an amplifier 54, both of which may be conventional types.

The gates E serve to actuate the pulse wave coincidence circuit 50 so that the magnitude of the signal F is sampled during each of the gates E. The output of the pulse wave coincidence circuit 50 is applied to a filter 56 which has a long time-constant with respect to the time-constant of the filter 14 and produces a signal G which has a magnitude which varies in accordance with the rate of increase in the magnitude of the respective master pulses A during each gate E. Signal G is applied to the control circuit of delay circuit 40 and serves to control the delay $\delta$ introduced by the slope controlled delay circuit 40.

Since the signals C are caused to occur when the respective master pulses A attain a predetermined amplitude such as two volts, it follows that the gates B are caused to occur a time $\delta$ before the respective master pulses attain the amplitude of two volts. It has been found that if the time-delay $\delta$ is caused to vary inversely with the rate of increase in the magnitude of the respective master pulses A at the times when the master pulses A attain a certain magnitude such as two volts, the true starting point of the master pulses A may be determined by subtracting the time $\delta$ from the time at which the master pulses A attain a magnitude of two volts. Since the leading edges of gates B are caused to occur a time $\delta$ before signals C, it follows that the leading edges of gates B are precisely coincident with the leading edges of the master pulses A. The slope controlled delay circuit 40 shown in Fig. 6 serves to produce the signals C which serve to introduce the time-delay $\delta$ required.

Referring now to Fig. 6, the triode tubes 58 and 60 are employed to produce voltage drops across their respective cathode resistors 62 and 64 which are compared in a diode 66 to produce signals C when the voltage between ground and the tap 67 on a resistor 64 exceeds the voltage across a resistor 62.

Tube 58 is normally supplied with positive grid voltage by means of a battery 68 and a resistor 70. Thus, the tube 58 is normally in a conducting condition and a voltage drop is produced across the cathode resistor 62. When each negative gate B occurs, the tube 58 is biased to cut-off for the duration of the gate and the voltage across condenser 72 decays exponentially due to the discharge of condenser 72 through resistor 62. The control signal G is applied across a grid resistor 74 and serves to apply a positive voltage to the grid of tube 60 so that tube 60 is in a conducting condition and a current flows through cathode resistor 64. A portion of the voltage drop across resistor 64 is applied to the anode of tube 66 through resistor 76 and the tap 67 on resistor 64. Resistor 62 and the tap 67 on resistor 64 are adjustable so that the time-delay introduced by circuit 40 may be adjusted.

Thus the signals produced across the resistors 62 and 64 are compared by the diode 66. When the voltage from the anode of the diode 66 to ground exceeds the voltage from the cathode of the diode 66 to ground, current flows from resistor 64 through resistor 76, diode 66 and resistor 62 to ground, and signals C (Fig. 8) are produced which, by exponential decays of an otherwise constant voltage each time that the voltage from the tap 67 on resistor 64 to ground exceeds the voltage across resistor 62, indicates the time $\delta$ after the leading edges of gates B at which the respective master pulses A attain a predetermined amplitude such as 2 volts. This time $\delta$ varies inversely with the magnitude of signal G as shown in the curve of Fig. 7.

Suitable circuit constants for the slope controlled delay circuit shown in Fig. 6 are as follows:

| | |
|---|---|
| Triodes 58 and 60 | Type 12AT7. |
| Diode 66 | Type 6AL5. |
| R62 | 15,000 ohms. |
| R64 | 5,000 ohms. |
| R70 | 24,000 ohms. |
| R74 | 10 megohms. |
| R76 | 51,000 ohms. |
| C72 | .0036 mf. |
| C78 | 100 mmf. |
| Battery 68 | 25 volts. |

The gates B are applied to a conventional differentiator 79 which produces a signal H which is applied to a conventional clipper and inverter 80 which in turn produces a series of pulses I, each of which occur in fixed time relation with respect to the instant when the respective master pulses A are initiated.

The slave pulses J are applied to a second servo loop which comprises a pulse wave coincidence circuit 12′, a filter 14′, a potentiometer 81 and a battery 82 serially connected therewith, a servo amplifier 84, a servomotor 86, a potentiometer 88 and a battery 90 serially connected therewith, a variable delay circuit 92 and a portion of the slope correction circuit 94. The pulse wave coincidence circuit 12′ and the filter 14′ may be the same as the circuit elements 12 and 14 described above. The servo amplifier 84 and the motor 86 may be conventional types. The variable delay circuit 92 may be a variable-delay one-shot multivibrator such as the type disclosed on page 591 of the book "Electronic Instruments," by Greenwood, Holdam and MacRae, published by the McGraw-Hill book company in 1948. Circuit 92 serves to produce a positive gate K which has a duration which varies directly with the magnitude of the control voltage produced by potentiometer 88.

The slope correction circuit 94 comprises a slope controlled delay circuit 40′, an amplifier 42′, a differentiator 44′, a clipper 46′, a gate generator 48′, a pulse wave coincidence circuit 50′, a differentiator 52′ and a filter 56′ which may be the same type as the corresponding circuit components 40 through 56 described above. A conventional delay circuit 96 and a conventional gate generator 98 are employed to interconnect the output M of clipper 46′ to the input of pulse wave coincidence circuit 50′.

Pulses I are applied to the input of variable delay circuit 92 and serve to initiate the respective gate pulses K produced thereby. Gates K are applied to slope controlled delay circuit 40′ which produces a signal L which decays at times δ′ after the trailing edges of gates K. It will be observed that the slope controlled delay circuit 40′ is actuated by the trailing edges of the positive gates K, whereas circuit 40 is actuated by the leading edges of the negative gates B. This is due to the fact that circuit 40′ must be actuated by a negative gate and the portions of signal K between each positive gate are employed as negative gates for circuit 40′. Signals L are amplified, differentiated and clipped to produce pulses M which are applied to gate generator 48′ which in turn produces gates N which are of very short duration with respect to the duration of the slave pulses J. The gates N serve to actuate pulse wave coincidence circuit 12′ so that circuit 12′ produces signals which are proportional to the magnitude of the slave pulses J during each gate N. This signal is applied to the filter 14′ and the output of the filter 14′ is applied to a servo amplifier 84 through the search bias potentiometer 81. The voltage introduced into the servo loop by the potentiometer 81 is of opposite polarity to the voltage produced by the filter 14′. The output of the servo amplifier 84 is employed to actuate the motor 86 which in turn controls the position of the potentiometer 88. The output of the potentiometer 88 is applied to the control circuit of the variable delay circuit 92 and serves to control the duration of each gate pulse K.

The second servo loop is adjusted by means of the potentiometer 81 so that each gate N is caused to occur when the respective slave pulses J attain a predetermined magnitude such as two volts.

The circuit constants of the slope controlled delay circuit 40′ are proportioned so that the delay δ′ introduced thereby is precisely equal to the difference in time between the time when the respective slave pulses J are initiated and the time when the slave pulses J attain a magnitude of two volts as discussed above with reference to slope controlled delay circuit 40. In this manner the trailing edges of gates K are caused to occur precisely at the instant when the respective slave pulses J are initiated. Thus, the duration of gates K is a measure of the time-delay $t$ between the respective master and slave pulses. Since the duration of gates K is determined by the voltage produced by potentiometer 88 which in turn is determined by the position of the rotor of motor 86, it follows that the time-delay $t$ between the master pulses A and the slave pulses J is determined automatically by reading an indicator 100 which shows the position of the rotor of motor 86.

The slope correction circuit 94 differs from the circuit 20 in that no amplifier is employed between the differentiator 52′ and the pulse wave coincidence circuit 50′ and in that the gates O which are applied to the pulse wave coincidence circuit 50′ are delayed a time $\alpha$ after the respective pulses M. In this manner the differentiated pulses P are sampled by the pulse wave coincidence circuit 50′ a fixed time $\alpha$ after the respective slave pulses J attain a predetermined amplitude such as two volts. The output of pulse wave coincidence circuit 50′ is smoothed by a filter 56′ which produces a signal Q which has a magnitude which varies in accordance with the rate of increase in the magnitude of the respective slave pulses J during a predetermined time $\alpha$ after the respective slave pulses J attain an amplitude of two volts. Signal Q is employed to control the delay introduced by slope controlled delay circuit 40′ as discussed above with reference to circuit 40.

It will be apparent that slope correction circuits 20 and 94 perform the same functions and that either circuit may be employed in both the first and second servo loops disclosed in Fig. 1.

Fig. 5 shows a slope correction circuit 102 which is the equivalent of the slope correction circuits 20 and 94 disclosed in Fig. 1. The slope correction circuit 102 differs from circuit 94 in that the slave pulses J are introduced directly to the pulse wave coincidence circuit 50′ without being differentiated. Since pulse wave coincidence circuit 50′ is actuated a fixed time $\alpha$ after the respective slave pulses J attain a predetermined amplitude, it follows that the output Q of filter 56′ is a signal which varies in accordance with the rate of increase in the magnitude of the respective slave pulses J during the time interval $\alpha$.

The apparatus shown in Fig. 9 illustrates the use of my slope correction circuit 20 in a Loran receiving system which is manually operated. The apparatus employed to produce pulses at the output of clipper 80 which are coincident with the leading edges of master pulses A is identical with the apparatus disclosed in the upper half of Fig. 1 which serves to produce pulses I. Identical apparatus is employed to produce pulses at the output of clipper 80′ which are coincident with the leading edges of slave pulses J. The output of clipper 80 is applied directly to one of the vertical deflection plates of a cathode-ray tube 104. The output of clipper 80′ is applied to the other vertical deflection plate of tube 104 through an adjustable delay circuit 106.

The horizontal deflection plates of tube 104 are connected to the output of a conventional sweep generator 108. Sweep generator 108 is actuated by a sweep synchronizer 110 which serves to initiate the sweep excursion a fixed time before each master pulse A occurs. Copending application S. N. 74,218 for a Synchronizer, filed February 2, 1949, by Winslow Palmer, now Patent No. 2,636,988 issued April 28, 1953, discloses suitable apparatus for use as the sweep synchronizer 110.

In the operation, the adjustable delay circuit 106 is adjusted until the pulses representing the master and slave pulses are coincident on the screen of the cathode-ray tube 104, and then the time-delay between the master and slave pulses is equal to the delay introduced by the adjustable delay circuit 106.

If desired, the pulses produced by clippers 80 and 80' may be applied directly to the vertical deflection plates of the cathode-ray tube 104, and the time-delay between the master and slave pulses is then determined by the spacing between the two pulses on the screen of tube 104. This may be accomplished by the apparatus shown in Fig. 9 by setting the adjustable delay circuit 106 so that no delay is introduced.

It will be observed that in the apparatus shown in Figs. 1 and 9, the master and slave pulses are sampled during the leading edges of the respective pulses so that the sampling process is not affected by sky-wave interference which, in conventional Loran systems, usually occurs about 50 microseconds after the direct wave signals are received.

Furthermore, it will be observed that the various servo loops employ large time-constant filter circuits so as to minimize the effects of random noise signals.

It will be apparent that various modifications can be made in the apparatus disclosed herein. For example, various types of well-known circuits may be employed instead of the four diode type pulse wave coincidence circuits 12, 12', 50 and 50' or instead of the variable-delay one-shot multivibrator type variable delay circuit 92 (Fig. 1) described herein, and the output of clippers 80 and 80' (Fig. 9) may be employed to actuate apparatus for automatically indicating a position of the craft on which the receiving system is located.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, an input circuit adapted to be connected to a source of recurrent control pulses, a differentiator connected to said input circuit, and a generator connected to said input circuit and to the output of said differentiator and responsive to a predetermined magnitude of said control pulses and the magnitude of the signal produced by said differentiator for producing a series of pulses in synchronism with said control pulses.

2. In combination, a source of recurrent control pulses, a first sampling circuit connected to said source for instantaneously sampling the magnitude of said control pulses, a differentiator connected to said source, a second sampling circuit connected to the output of said differentiator, a servo loop including a gate generator responsive to the outputs of said first and second sampling circuits and having its output connected to the input circuits of said first and second sampling circuits for producing a series of pulses in synchronism with said control pulses.

3. In combination, an input circuit adapted to be connected to a source of recurrent control pulses, means connected to said input circuit for instantaneously sampling the magnitude of said control pulses, generator means responsive to the output of said sampling means for producing a series of signals having a repetition rate substantially equal to the repetition rate of said control pulses, a variable delay circuit connected to the output of said generator means and having a control circuit connected to said input circuit and responsive to the rate of increase in the magnitude of said control pulses for delaying said series of signals a time which varies substantially inversely with the rate of increase in the magnitude of said control pulses, and means interconnecting the output of said variable delay circuit and the control circuit of said sampling means for actuating said sampling means in response to the delayed pulses.

4. In a synchronizer system having an input circuit adapted to be connected to a source of recurrent control pulses, a differentiator connected to said input circuit, and a servo system responsive to said control pulses and to the output of said differentiator and including means for sampling the magnitude of said control pulses and the magnitude of the output of said differentiator to produce first and second control voltages, said servo system further including a pulse generator having its frequency controlled by said first control voltage and a variable delay circuit having its output connected to the control circuits of said sampling means and being responsive to said second control voltage for producing pulses delayed with respect to the respective pulses produced by said pulse generator a time which varies substantially inversely with the magnitude of said second control voltage.

5. In a synchronizer system having an input circuit adapted to be connected to a source of recurrent control pulses, means connected to said input circuit for instantaneously sampling the magnitude of said control pulses, a filter connected to the output of said sampling means, generator means connected to the output of said filter for producing signals coincident with said control pulses, a variable delay circuit connected to the output of said generator and having a control circuit connected to said input circuit and responsive to the rate of increase in the magnitude of said control pulses for delaying said coincident signals a time which varies inversely with the rate of increase in the magnitude of said control pulses, and means interconnecting the output of said delay circuit and the control circuit of said sampling means for actuating said sampling means in response to the delayed pulses.

6. The apparatus of claim 5, wherein said filter has a large time-constant with respect to the repetition rate of said control pulses.

7. In combination, an input circuit adapted to be connected to a source of recurrent control pulses, means connected to said input circuit for instantaneously sampling the magnitude of said control pulses, means responsive to the output of said sampling means for producing signals having a repetition rate substantially equal to the repetition rate of said control pulses, means connected to said input circuit for producing a control voltage having a magnitude which varies in accordance with the rate of increase in the magnitude of the respective control pulses, a variable delay circuit responsive to said control voltage for delaying said signals a time which varies inversely and substantially exponentially with the magnitude of said control voltage, and means interconnecting the output of said delay circuit and the control circuit of said sampling means for actuating said sampling means in response to each of the delayed pulses.

8. In a synchronizer system having an input circuit adapted to be connected to a source of recurrent control pulses, means connected to said input circuit for sampling the magnitude of said control pulses, variable generator means responsive to the output of said sampling means for producing signals having a repetition rate substantially equal to the repetition rate of said control pulses, a variable delay circuit interconnecting the output of said generator means and the control circuit of said sampling means, said variable delay circuit having a control circuit and being adapted to produce signals delayed a time which varies inversely with the magnitude of a voltage applied to said control circuit, a second sampling means having its control circuit connected to the output of said variable delay circuit, differentiating means interconnecting said input circuit and the input of said second sampling means, and filter means connected between the output of said second sampling means and the control circuit of said variable delaye circuit.

9. In a synchronizer system having an input circuit adapted to be connected to a source of recurrent control pulses, means connected to said input circuit for sampling the magnitude of said control pulses, variable generator means responsive to the output of said sampling means for producing signals having a repetition rate substantially equal to the repetition rate of said control pulses, a variable delay circuit interconnecting the output of said generator means and the control circuit of said sampling means, said variable delay circuit having a control circuit for causing the delay circuit to produce signals delayed after the signals produced by said generator means a time which varies inversely with the magnitude of a voltage applied to said control circuit, a second sampling means, a fixed delay circuit interconnecting the output of said variable delay circuit and the control circuit of said second sampling means, means interconnecting the input of said second sampling means and said input circuit, and filter means connected between the output of said second sampling means and the control circuit of said variable delay circuit.

10. The apparatus of claim 9, wherein said interconnecting means includes a differentiating circuit.

11. In a radio system employing a pair of transmitters to produce a first and a second series of pulse-modulated electromagnetic waves having predetermined time relationships, a receiver adapted to detect said waves and produce control pulses corresponding to said first and second series of pulses, means including differentiating means responsive to said control pulses for producing first and second control voltages having magnitudes which vary in accordance with the rate of increase in the magnitudes of the first and second series of control pulses respectively, a first pulse generator responsive to said first control voltage and to the control pulses which correspond to said first series of pulses for producing a series of pulses in synchronism with said first series of pulses, a second pulse generator responsive to said second control voltage and to the control pulses which correspond to said second series of pulses for producing a series of pulses in synchronism with said second series of pulses, and means connected to the outputs of said first and second pulse generators for comparing the time-delay between said first and second series of pulses.

12. In a radio system employing a pair of transmitters to produce a first and a second series of pulse-modulated electromagnetic waves having predetermined time relationships, a receiver adapted to detect said waves and produce control pulses corresponding to said first and second series of pulses, means responsive to said control pulses for producing first and second control voltages having magnitudes which vary in accordance with the rate of increase in the magnitudes of the first and second series of control pulses respectively, first and second pulse generators having control circuits for varying the frequency of the pulses produced thereby, first and second servo systems including said first and second pulse generators respectively and being responsive to said control pulses for causing said first and second pulse generators to produce pulses in synchronism with the first and second series of control pulses respectively, said first servo system further including a variable delay circuit responsive to said first control voltage and to the output of said first pulse generator for producing pulses delayed with respect to the respective pulses produced by said first pulse generator a time which varies inversely with the magnitude of said first control voltage, said second servo system further including a variable delay circuit responsive to said second control voltage and to the output of said second pulse generator for producing pulses delayed with respect to the respective pulses produced by said second pulse generator a time which varies inversely with the magnitude of said second control voltage, and means connected to the outputs of said first and second pulse generators for comparing the time-delay between the pulses produced thereby.

References Cited in the file of this patent
UNITED STATES PATENTS

| 2,435,598 | Oliver | Feb. 10, 1948 |
| 2,506,335 | Bias et al. | May 2, 1950 |
| 2,523,244 | Woodward | Sept. 19, 1950 |